3,657,292
PROCESS FOR THE PREPARATION OF 2-ACYLOXYCYCLODODECANONES
George William Parshall, Wilmington, Del., assignor to E. I. duPont de Nemours and Company, Wilmington, Del.
No Drawing. Filed May 15, 1970, Ser. No. 37,929
Int. Cl. C07c 67/04, 69/14, 55/04
U.S. Cl. 260—410                5 Claims

ABSTRACT OF THE DISCLOSURE

A 2-acyloxycyclododecanone is prepared by the oxidation of cyclododecene with rhenium heptoxide in the presence of a carboxylic acid anhydride. A 2-acyloxycyclododecanone can be further oxidized with hydrogen peroxide to 1,12-dodecanedioic acid, which is useful as a starting material for the preparation of fiber-forming polycarbonamides.

BACKGROUND OF THE INVENTION

Field of the invention

This invention relates to novel 2-acyloxycyclododecanones, which are useful intermediates to 1,12-dodecanedioic acid, as well as to a process for the preparation of 2-acyloxycyclododecanones by oxidation of cyclododecene.

Prior art

U.S. 3,393,225 (to Fenton) discloses that oxidation of an acyclic olefin with rhenium heptoxide in the presence of a carboxylic acid anhydride leads to the corresponding glycol dicarboxylates. Glycol dicarboxylates also are obtained, according to U. S. 3,403,175 (to Wolgemuth), by noncatalytic reaction of olefins in the presence of carboxylic acid anhydrides. There have been no reports of oxidation of cyclic olefins to cyclic acyloxyketones.

SUMMARY OF THE INVENTION

It has now been discovered, according to this invention, that oxidation of cyclododecene by rhenium heptoxide in the presence of a carboxylic acid anhydride at about 25–200° C. leads to the corresponding 2-acyloxycyclododecanone (1). This process can be illustrated by the following equation:

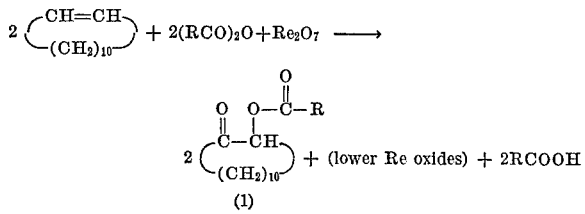

(1)

in which R is a saturated alkyl group of 1–12 carbon atoms.

The process is readily operated in a cyclic manner by reoxidizing the lower rhenium oxides formed in this reaction to rhenium heptoxide by heating with air or oxygen at 150° C. or above, as shown in W. H. Davenport, J. W. Spelman and H. J. Vaeth, "Rhenium Chemicals, Their Properties and Applications," Cleveland Refractory Metals (1969).

DETAILED DESCRIPTION OF THE INVENTION

The most convenient temperature range for contacting all the components is about 50–150° C. Above the upper limit, there is an increased risk of some degradation of the reaction products, while below the lower limit, the reaction rates sometimes are too low for an efficient operation. Pressure is not a significant variable in this process. Pressures above and below atmospheric pressure can be employed, but atmospheric pressure is the most convenient to use. Rhenium heptoxide is readily soluble in the mixture of cyclododecene and acid anhydride, and the reaction is, therefore, carried out in a homogeneous, liquid phase.

The starting proportions of cyclododecene, acid anhydride and rhenium heptoxide can be varied broadly. Any proportions of these three components which are brought together under the above conditions will yield at least some of the 2-acyloxycyclododecanone product. In practice, it is sometimes preferable to use up to about a tenfold excess of the acid anhydride, which at the same time serves as a reaction medium. An excess of up to about 100 times the stoichiometric amount of cyclododecene can also be employed. The process of this invention can be carried out with or without an added liquid reaction medium. Suitable reaction media include carboxylic acids, e.g., compounds of the formula RCOOH, and their anhydrides, e.g., compounds of the formula $(RCO)_2O$, where R is defined as above.

Representative R radicals include the following saturated alkyl groups: methyl, ethyl, propyl, isopropyl, butyl, isobutyl, sec-butyl, tert-butyl, pentyl, isopentyl, tert-pentyl, hexyl, heptyl, isoheptyl, octyl, nonyl, decyl, undecyl, and dodecyl.

The 2-acyloxycyclododecanone product is recovered from the reaction mixture by known methods such as distillation, chromatographic separation, crystallization, and the like.

The 2-acyloxycyclododecanones of Formula 1 above can all be oxidized to 1,12-dodecanedioic acid, which is a known intermediate for the preparation of fiber-forming polyesters and polyamides.

This invention is now illustrated by the following representatvie examples of certain preferred embodiments thereof. All parts are by weight unless otherwise indicated. All temperatures are in degrees centigrade.

EXAMPLE 1

A mixture of 5 g. of $Re_2O_7$, 25 g. of acetic anhydride and 25 g. of cyclododecene was stirred at 100° C. for 4 hours. The $Re_2O_7$ turned purple when the olefin was added. The mixture was filtered when cool to give 4.7 g. of black solid (lower rhenium oxides) and a dark liquid. Distillation of the filtrate removed acetic anhydride, B.P. 70° C./100 mm., and cyclododecene, B.P. 82.5–83.3° C. at 2.2–2.5 mm. (recovery 22 g.). The black oily residue was distilled twice at ca. 105° C. at 0.01 mm. to give, finally, ca. 1 ml. of a yellow oil which partially crystallized on standing. Recrystallization from methanol gave off-white crystals, M.P. 55–61° C. This crude product was chromatographed on silicic acid, using pentane-$CH_2Cl_2$ mixtures for elution. A material which was eluted was 50% $CH_2Cl_2$ was recrystallized from methanol to give off-white crystals of 2-acetoxycyclododecanone which were dried by sublimation, M.P. 77.5–80.5° C.

*Analysis.*—Calcd. for $C_{14}H_{24}O_3$ (percent): C, 70.1; H, 10.1. Found (percent): C, 70.5; H, 10.0. (Average of three determinations.)

The proton NMR spectrum (CCl₄ solution, Me₄Si internal standard) showed clean signals at the following positions (in addition to a broad hump):

| $\tau$ | Relative intensity | Form | Assignment |
|---|---|---|---|
| 5.0 | 1 | Pair of doublets | $\underset{-C-C-}{\overset{O\ \ \ O\ \ \ H}{\parallel\ \ \ \diagup}}$ |
| 7.53 | 2 | 1:2:1 triplet | $\underset{H_2C-C}{\overset{O}{\parallel}}$ |
| 7.95 | 3 | Sharp singlet | Acetate $CH_3$. |
| 8.70 | About 18 | Singlet | Ring $CH_2$. |

The infrared spectrum of the recrystallized material showed two carbonyl stretching frequencies of equal intensity at 1730 and 1750 cm.⁻¹ (CCl₄ solution). The mass spectrum showed a parent m/e peak at 240 corresponding to the calculated molecular weight. Major peaks at m/e 197 and 169 correspond to the loss of CH₃CO and CO fragments, successively, from the parent ion. The CH₃CO⁺ peak at m/e 43 was very intense.

EXAMPLE 2

A mixture of 10 g. of Re₂O₇, 25 g. of cyclododecene and 25 ml. of acetic anhydride was heated at 100° C. for 4 hours. As in Example 1, the mixture became purple when the olefin was added. Filtration gave 11.06 g. of black solid. The filtrate was distilled to give ca. 1.5 ml. of viscous yellow-brown liquid (B.P. ca. 100° C. at 5μ) which was redistilled on a molecular still. Recrystallization from methanol gave 0.75 g. of off-white 2-acetoxycyclododecanone (M.P. 81–82° C. after sublimation) with infrared and proton NMR spectra essentially identical to that of the product from Example 1. A further 0.16 g. of the same compound (M.P. 78–79° C.) was obtained by chromatography of the oil obtained by evaporation of the methanol filtrate.

EXAMPLE 3

A solution of 0.45 g. of 2-acetoxycyclododecanone (prepared as in Example 2), 0.1 g. of Re₂O₇ catalyst and 1.0 ml. of 30% H₂O₂ in 10 ml. of acetic acid was heated on a steam bath for 2 hours. The faintly yellow solution was evaporated in an air-stream to give a gummy black residue. The residue was dissolved in ether and the ether was extracted with 5% of NaHCO₃ solution. The aqueous extract was neutralized with concentrated HCl to give a white precipitate, M.P. 113–117° C. (softened 107° C.). This solid was recrystallized from water to give white crystals, M.P. 122–124° C., of 1,12-dodecanedioic acid. The infrared spectrum contained all the bands found in the infrared spectrum of an authentic sample of 1,12-dodecanedioic acid and showed no extraneous bands.

EXAMPLE 4

2-acetoxycyclododecanone oxime

A 1.0 g.-portion of crude 2-acetoxycyclododecanone, prepared as in Example 2, 1.0 g. of hydroxylamine hydrochloride, 5 ml. of pyridine and 5 ml. of ethanol was boiled under reflux for 2 hours. Isolation of the product by evaporation and washing with water gave an oil. Crystallization from aqueous ethanol gave off-white crystals, M.P. 142–144° C. The infrared spectrum (saturated solution in CCl₄) showed OH at ca. 3250 cm.⁻¹ and weak C=N at ca. 1670 cm.⁻¹ as in cyclododecanone oxime. In addition, a strong band at ca. 1745 cm.⁻¹ was assignable to acetate C=O, consistent with the identification of this material as 2-acetoxycyclododecanone oxime.

α-Acyloxycyclododecanone oximes have been previously prepared by indirect methods, as shown in Japanese Pat. 21,345 (1967) to Toyo Rayon K.K. However, these oximes cannot be hydrolyzed to the corresponding α-acyloxycyclododecanones by the conventional method ("Organic Syntheses," A. H. Blatt, Ed., Collective vol. 1, 2nd Edition, pp. 318–321, John Wiley & Sons, Inc., New York, 1948). As shown in Example 5, below, the acyloxy group does not survive such hydrolysis.

EXAMPLE 5

Hydrolysis of 2-acetoxycyclododecanone oxime

A suspension of 0.2 g. of 2-acetoxycyclododecanone oxime (prepared as in Example 4) in chloroform was heated with 2 ml. of normal HCl for 1 hour at about 100° C. The solvent evaporated to leave an oil suspended in the aqueous layer. The infrared spectrum of the oil in carbon tetrachloride solution showed a single strong carbonyl stretching frequency at 1735 cm.⁻¹ assignable to a ketone function. The absence of a higher frequency carbonyl absorption indicates that the acetate group was hydrolytically cleaved under these conditions.

When a carboxylic acid anhydride selected from the second column of the table, below, is substituted for acetic anhydride in the procedures of Examples 1 and 2, above, the corresponding 2-acyloxycyclododecanone shown in the third column is obtained.

TABLE

| Item | Carboxylic acid anhydride | 2-acyloxycyclododecanone | R |
|---|---|---|---|
| 1 | Propionic | 2-propionoxycyclododecanone | Ethyl. |
| 2 | Butyric | 2-butyroxycyclododecanone | Propyl. |
| 3 | Pentanoic | 2-pentanooxycyclododecanone | Butyl. |
| 4 | Heptanoic | 2-heptanoxycyclododecanone | Hexyl. |
| 5 | Dodecanoic | 2-dodecanoxycyclododecanone | Undecyl. |

1,12-dodecanedioic acid, which can be obtained by the oxidation of a 2-acyloxycyclododecanone according to the procedure of Example 3, above, is a useful starting material for the preparation of fiber-forming polycarbonamides. Such polymers are disclosed, for example, in U.S. Pat. 3,393,210 (to Speck).

The embodiments of the invention in which an exclusive property or privilege is claimed are defined as follows:

1. A process for the preparation of a 2-acyloxycyclododecanone having the formula

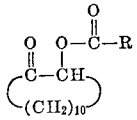

in which R is a saturated alkyl group of 1 to 12 carbon atoms, said process comprising the step of contacting cyclododecene with rhenium heptoxide at about 25–200° C. in the presence of a carboxylic acid anhydride, (RCO)₂O.

2. The process of claim 1 operated in a cyclic manner, said process comprising the additional step of reoxidizing the lower rhenium oxides, formed in the main step, to rhenium heptoxide by heating with air or oxygen to at least 150° C.

3. The process of claim 1 in which the temperature is maintained within the range of about 50–150° C.

4. The process of claim 1 in which the starting acid anhydride is present in up to about tenfold excess.

5. The process of claim 1 in which the starting cyclododecene is present in up to about hundredfold excess.

References Cited

Chemical Abstracts 60 5360d (1964).
Chemical Abstracts 47 6879b (1953).

LEWIS GOTTS, Primary Examiner

D. G. RIVERS, Assistant Examiner

U.S. Cl. X.R.

260—488 R, 497 R, 537 R, 537 P